US008832325B1

(12) United States Patent
George et al.

(10) Patent No.: US 8,832,325 B1
(45) Date of Patent: *Sep. 9, 2014

(54) TRANSFER BETWEEN STORAGE DEVICES

(75) Inventors: Subin George, Framingham, MA (US); Michael J. Scharland, Franklin, MA (US); Arieh Don, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 42 days.

This patent is subject to a terminal disclaimer.

(21) Appl. No.: 13/536,424

(22) Filed: Jun. 28, 2012

(51) Int. Cl.
*G06F 3/00* (2006.01)
*G06F 15/16* (2006.01)

(52) U.S. Cl.
USPC ........ 710/7; 710/5; 710/20; 710/21; 709/231; 709/232; 709/236; 709/237; 712/220; 712/225

(58) Field of Classification Search
None
See application file for complete search history.

(56) References Cited

U.S. PATENT DOCUMENTS

| 6,711,632 | B1 * | 3/2004 | Chow et al. | 710/29 |
| 7,664,839 | B1 * | 2/2010 | Karr et al. | 709/223 |
| 7,707,331 | B1 | 4/2010 | Brown et al. | |
| 7,856,022 | B1 | 12/2010 | Wigmore | |
| 8,028,062 | B1 | 9/2011 | Wigmore et al. | |
| 8,028,110 | B1 | 9/2011 | Wigmore | |
| 8,468,180 | B1 * | 6/2013 | Meiri et al. | 707/809 |
| 8,694,700 | B1 * | 4/2014 | Natanzon et al. | 710/52 |
| 2006/0126468 | A1 * | 6/2006 | McGovern et al. | 369/53.1 |
| 2009/0248975 | A1 * | 10/2009 | Daud et al. | 711/112 |
| 2010/0094803 | A1 * | 4/2010 | Yamakawa et al. | 707/609 |
| 2011/0087787 | A1 * | 4/2011 | Lubbers et al. | 709/226 |

* cited by examiner

*Primary Examiner* — Michael Sun
(74) *Attorney, Agent, or Firm* — Muirhead and Saturnelli, LLC

(57) ABSTRACT

Migrating data from a source storage device to a target storage device includes creating new paths to the target storage device, setting the target storage device to a state where I/O operations are initially accepted, where accepted I/O operations are rejected some time after acceptance, setting the source storage device to a state where at least some I/O operations are rejected, transferring metadata corresponding to the source storage device to the target storage device, where state information is transferred from the source storage device to the target storage device and setting the target storage device to a state where I/O operations are accepted and performed. Migrating data from a source storage device to a target storage device may also include creating new volumes on the target storage device and transferring data from the source storage device to the target storage device.

18 Claims, 8 Drawing Sheets

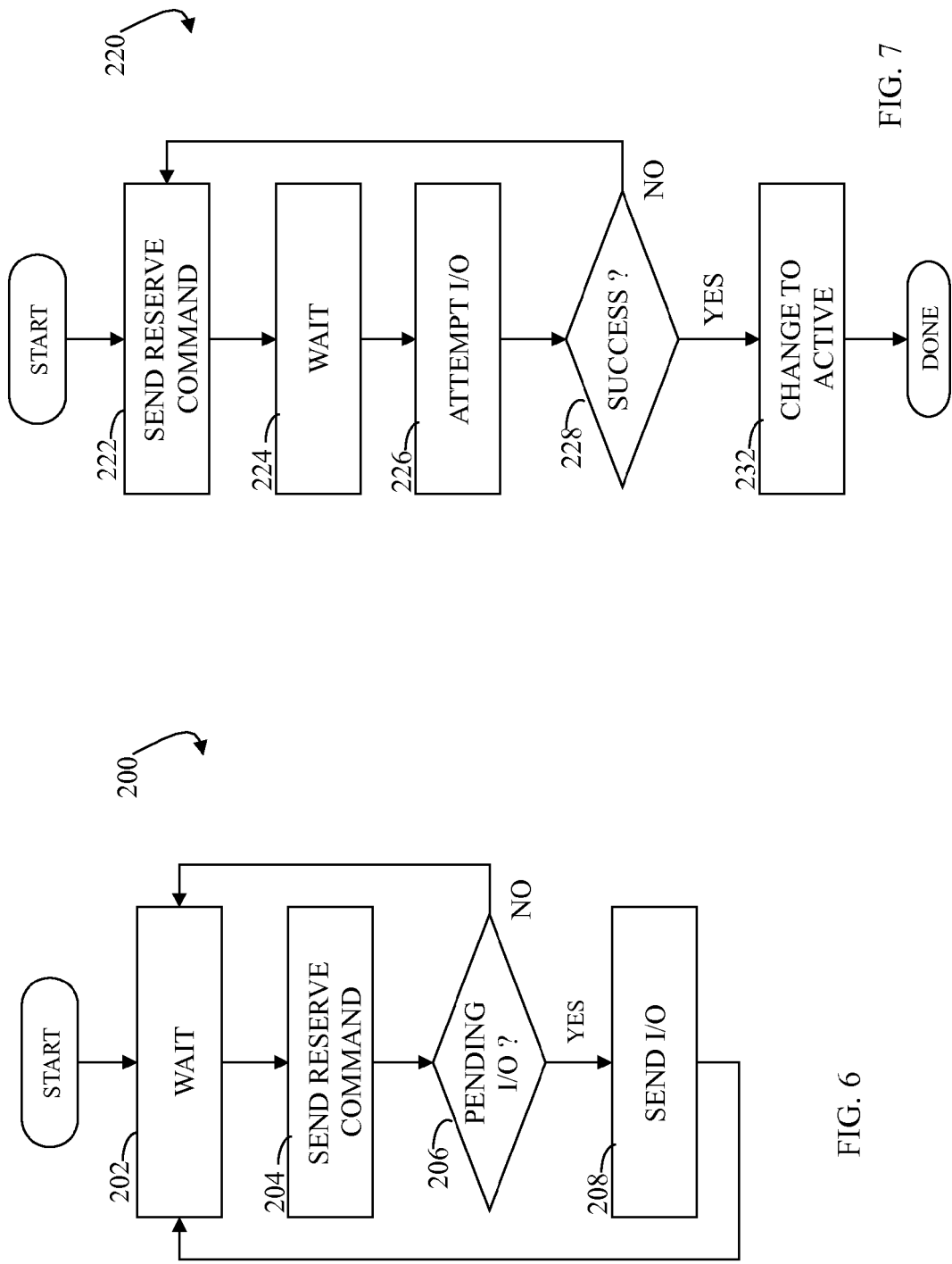

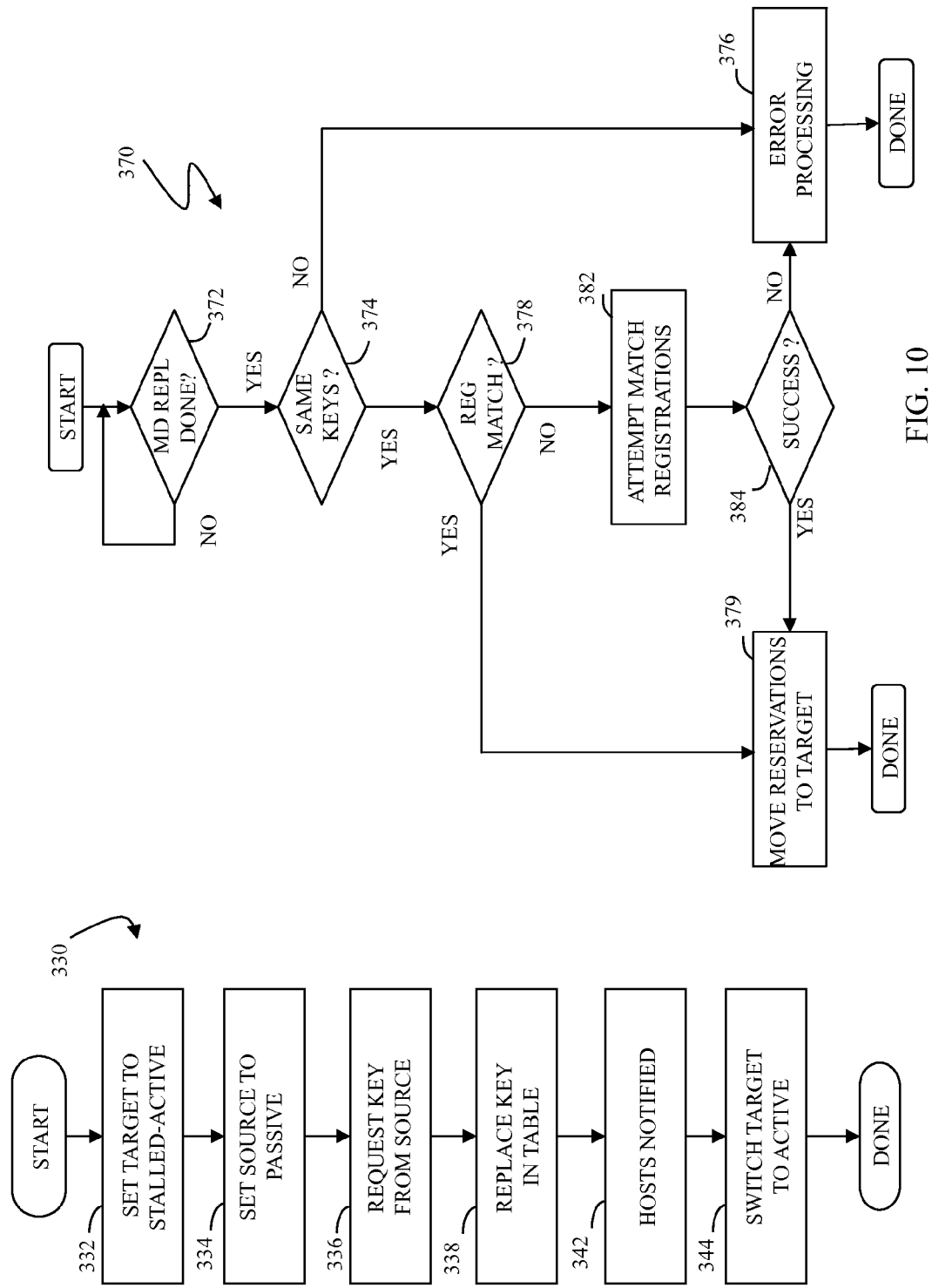

TRANSFER BETWEEN STORAGE DEVICES

BACKGROUND OF THE INVENTION

1. Technical Field

This application relates to the field of storage devices, and more particularly to the field of migrating data between storage devices.

2. Description of Related Art

It is desirable to be able to move user applications and data among servers and storage arrays in a non-disruptive fashion while the user is actively using the applications and/or data. Although various techniques exist to facilitate non-disruptive data migration, these techniques do not necessarily properly transfer I/O state information. However, many systems rely on metadata, such as I/O state information, for proper operation. For example, in some computer cluster configurations, each of the computers maintains its state (active or passive) and, in some cases, changes its state, based on I/O metadata. Such a system may not operate properly if data was migrated without also properly migrating the metadata.

Accordingly, it is desirable to provide a system that can seamlessly migrate data as well as associated metadata, including state information, associated with the data.

SUMMARY OF THE INVENTION

According to the system described herein, migrating data from a source storage device to a target storage device includes creating new paths to the target storage device, setting the target storage device to a state where I/O operations are initially accepted, where accepted I/O operations are rejected some time after acceptance, setting the source storage device to a state where at least some I/O operations are rejected, transferring metadata corresponding to the source storage device to the target storage device, where state information is transferred from the source storage device to the target storage device and setting the target storage device to a state where I/O operations are accepted and performed. Migrating data from a source storage device to a target storage device may also include creating new volumes on the target storage device and transferring data from the source storage device to the target storage device. Setting the target storage device to a state where I/O operations are accepted and performed may occur after all of the metadata and data is transferred from the source storage device to the target storage device. Migrating data from a source storage device to a target storage device may also include dismantling the old paths. Transferring metadata may include exporting the metadata from the source storage device to a platform-independent format and then subsequently importing the metadata to the target storage device and a format of the metadata on the target storage device may be different from a format of the metadata on the source storage device. Each of the paths may include a source port, a target port, a LUN, a state descriptor, and a reservation key. The paths may correspond to SCSI connections. A process manager may interact with a SCSI driver to transfer the metadata. I/O operations may be rejected with a check condition status between seven and eight seconds after being received.

According further to the system described herein, computer software, provided in a non-transitory computer readable medium, migrates data from a source storage device to a target storage device. The software includes executable code that creates new paths to the target storage device, executable code that sets the target storage device to a state where I/O operations are initially accepted, where accepted I/O operations are rejected some time after acceptance, executable code that sets the source storage device to a state where at least some I/O operations are rejected, executable code that transfers metadata corresponding to the source storage device to the target storage device, where state information is transferred from the source storage device to the target storage device, and executable code that sets the target storage device to a state where I/O operations are accepted and performed. The software may also include executable code that creates new volumes on the target storage device and executable code that transfers data from the source storage device to the target storage device. The target storage device may be set to a state where I/O operations are accepted and performed after all of the metadata and data is transferred from the source storage device to the target storage device. The software may also include executable code that dismantles the old paths. Executable code that transfers metadata may include executable code that exports the metadata from the source storage device to a platform-independent format and may include executable code that imports the metadata to the target storage device and a format of the metadata on the target storage device may be different from a format of the metadata on the source storage device. Each of the paths may include a source port, a target port, a LUN, a state descriptor, and a registration key. The paths may correspond to SCSI connections. A process manager may interact with a SCSI driver to transfer the metadata. I/O operations may be rejected with a check condition status between seven and eight seconds after being received.

According further to the system described herein, determining whether to migrate from a source storage device to a target storage device includes determining if the target storage device is accessible by hosts that access the source storage device, determining if reservation information stored on the target storage device matches reservation information stored on the source storage device and migrating from the source storage device to the target storage device if the target storage device is accessible by hosts that access the source storage device and reservation information stored on the target storage device matches reservation information stored on the source storage device. Determining whether to migrate from a source storage device to a target storage device may also include, in response to initially determining that the reservation information stored on the target storage device does not match the reservation information stored on the source storage device, attempting to match the reservation information. Attempting to match the reservation information may include requesting key information from the source storage device. Attempting to match the reservation information may include requesting unique IDs from the source storage device. Determining whether to migrate from a source storage device to a target storage device may include initiating data and metadata replication between the source storage device and the target storage device. Migrating from the source storage device to the target storage device may be delayed until replication of metadata between the source storage device and the target storage device is complete. Migrating from the source storage device to the target storage device may include setting the target storage device to a state where I/O operations are accepted and then are rejected with a check condition status some time after acceptance, setting the source storage device to a state where at least some I/O operations are rejected, transferring metadata from the source storage device to the target storage device, and setting the target storage device to a state where I/O operations are accepted and performed after transferring the metadata. I/O operations may be rejected with a check condition status between seven and eight seconds after being received. Determining whether to migrate from a source storage device to a target storage device may include creating volumes on the target storage device and transferring data from volumes on the source storage device to the volumes on the target storage device.

According further to the system described herein, computer software, provided in a non-transitory computer-readable medium, determines whether to migrate from a source storage device to a target storage device. The software includes executable code that determines if the target storage device is accessible by hosts that access the source storage device, executable code that determines if reservation information stored on the target storage device matches reservation information stored on the source storage device and executable code that causes a migration from the source storage device to the target storage device if the target storage device is accessible by hosts that access the source storage device and reservation information stored on the target storage device matches reservation information stored on the source storage device. The software may also include executable code that attempts to match the reservation information in response to initially determining that the reservation information stored on the target storage device does not match the reservation information stored on the source storage device. Executable code that attempts to match the reservation information may request key information from the source storage device. Executable code that attempts to match the reservation information may request unique IDs from the source storage device. The software may also include executable code that initiates data and metadata replication between the source storage device and the target storage device is complete. Executable code may cause migration from the source storage device to the target storage device to be delayed until metadata replication between the source storage device and the target storage device is complete. Executable code that causes migration from the source storage device to the target storage device may include executable code that sets the target storage device to a state where I/O operations are accepted and then are rejected with a check condition status some time after acceptance, executable code that sets the source storage device to a state where at least some I/O operations are rejected, executable code that transfers metadata from the source storage device to the target storage device, and executable code that sets the target storage device to a state where I/O operations are accepted and performed after transferring the metadata. I/O operations may be rejected with a check condition status between seven and eight seconds after being received. The software may also include executable code that creates volumes on the target storage device and executable code that transfers data from volumes on the source storage device to the volumes on the target storage device.

BRIEF DESCRIPTION OF DRAWINGS

FIG. 6 is a flow chart illustrating steps performed by an active host to maintain its status in connection with the system described herein.

FIG. 7 is a flow chart illustrating steps performed by a passive host to maintain its status and possibly become an active host in connection with the system described herein.

FIG. 9 is a flow chart illustrating steps performed in connection with migration cutover according to an embodiment of the system described herein.

FIG. 10 s a flow chart illustrating steps performed in connection with determining whether to migrate from a source storage device to a target storage device according to an embodiment of the system described herein.

DETAILED DESCRIPTION OF VARIOUS EMBODIMENTS

Figure 1:
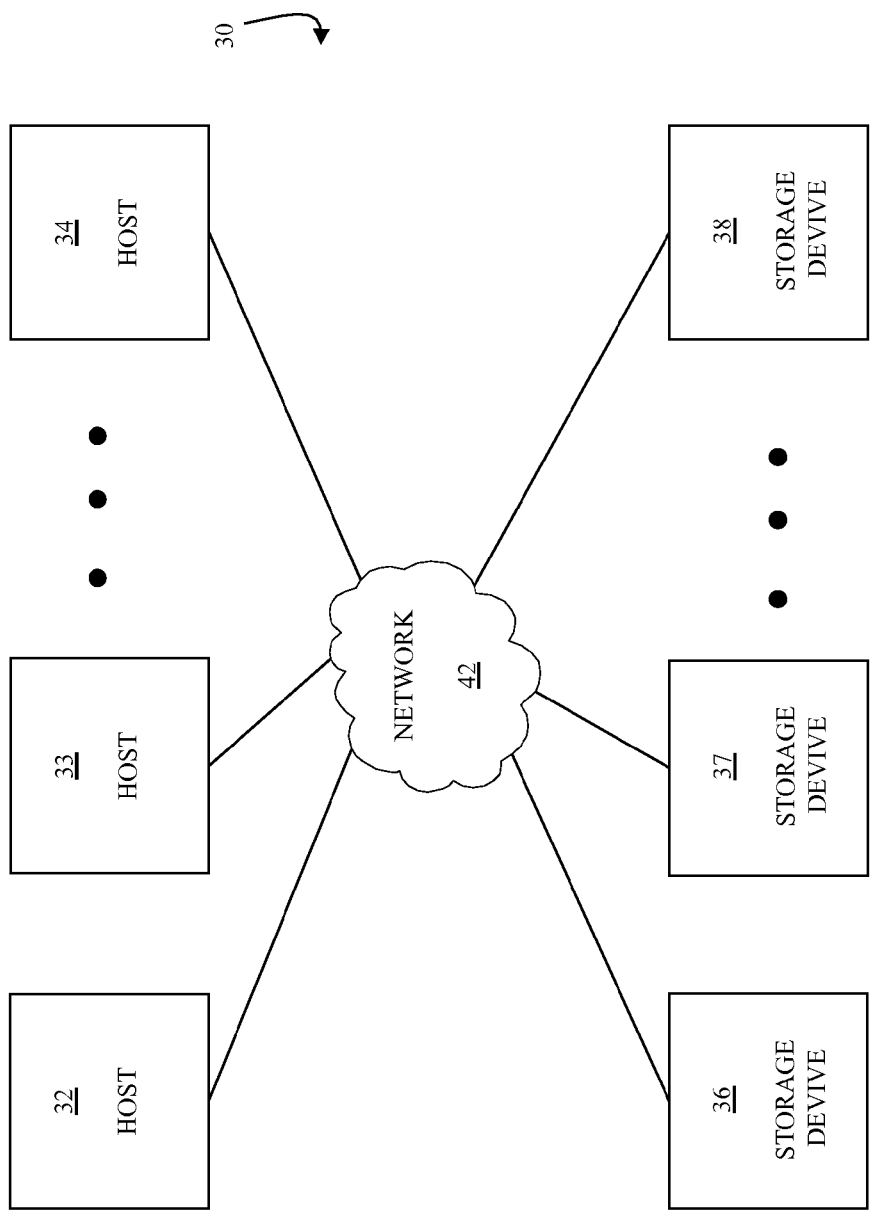
FIG. 1 is a schematic a diagram that shows a plurality of hosts coupled to a plurality of storage devices via a network according to an embodiment of the system described herein.

Referring to FIG. 1, a diagram 30 shows a plurality of hosts 32-34 coupled to a plurality of storage devices 36-38 via a network 42. The hosts 32-34 represent any processing devices. There may be any number of hosts and the hosts 32-34 may or may not be the same (i.e., the same type of device). Similarly, the storage devices 36-38 represent any storage devices. There may be any number of storage devices and the storage devices 36-38 may or may not be the same (i.e., same type of device). Each of the hosts 32-34 may be selectively coupled to one or more of the storage devices 36-38 to access data therefrom through the network 42. Note that each of the storage devices 36-38 may be coupled to more than one of the hosts 32-34. The network may be any appropriate mechanism for providing data interconnections, including a SAN, a WAN, a LAN, the World-Wide Web, a cloud, etc. or some combination thereof.

The system described herein provides for porting data images (e.g., data) from one of the storage devices 36-38 to another one of the storage devices 36-38. As discussed in detail herein, it is desirable to be able to maintain metadata (state information) in connection with porting data. The system described herein provides a mechanism for doing so. The hosts 32-34 are connected to the storage devices 36-38 via paths therebetween. Paths are described in more detail elsewhere herein.

Figure 2:
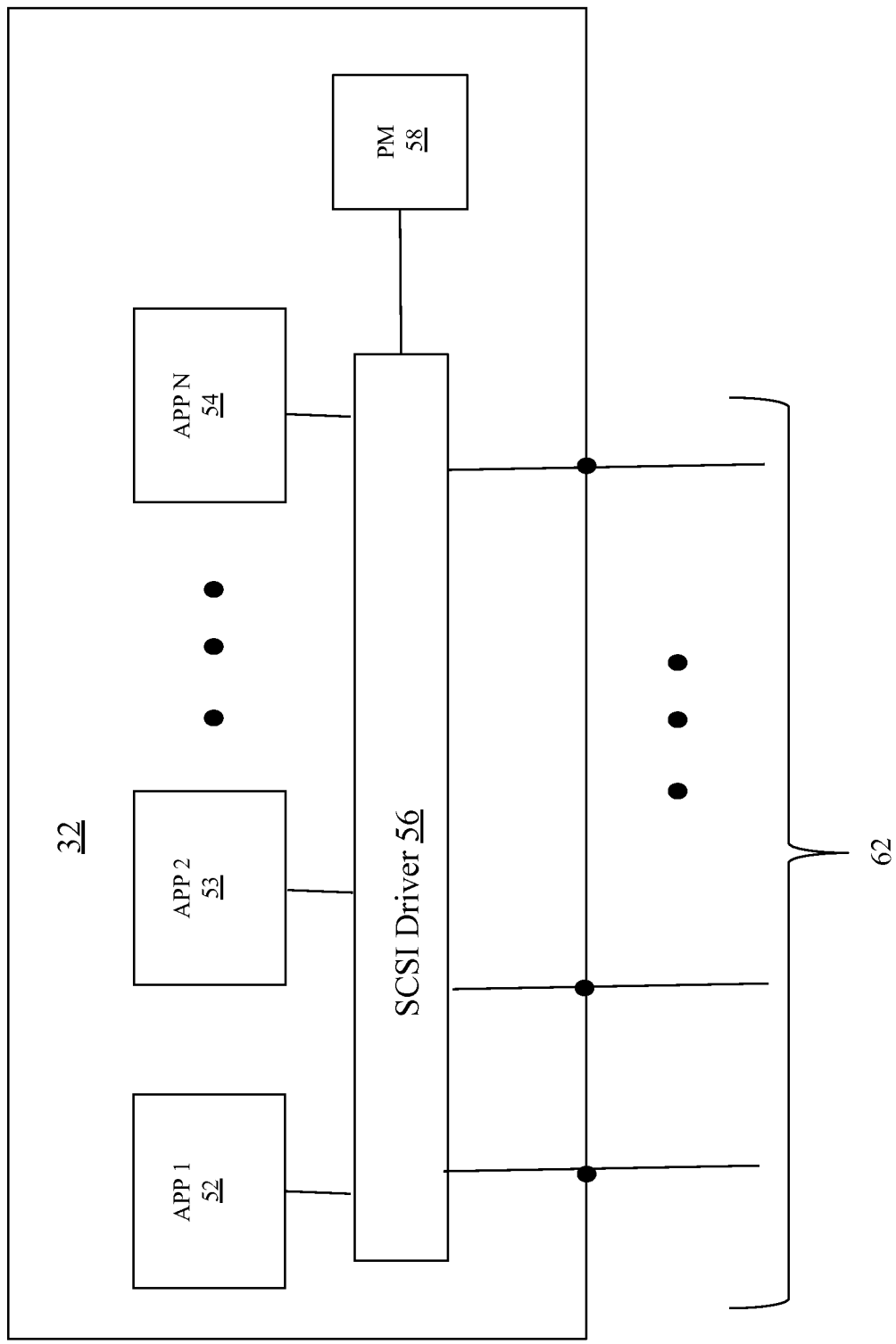
FIG. 2 is a schematic diagram illustrating in more detail a host according to an embodiment of the system described herein.

Referring to FIG. 2, the host 32 is shown in more detail as including a plurality of applications 52-54, a multipathing SCSI driver 56, and a process manager 58. Although the specific host 32 is shown in FIG. 2, the discussion herein is meant to include any host or other processing device. The applications 52-54 represent any number of applications that may perform any appropriate type of processing. The applications 52-54 send and receive I/O through the multipathing SCSI driver 56, which provides appropriate low level driver functionality to the applications 52-54. In an embodiment herein, the multipathing SCSI driver 56 may provide conventional SCSI I/O functionality using, for example, the SCSI-2 protocol or the SCSI-3 protocol.

The host 32 also includes a plurality of ports 62 that provide logical I/O channels for the host 32. Each of the ports 62 may correspond to a separate physical connection or at least some of the ports 62 may correspond to the same physical connection. The SCSI driver 56 may maintain a connection table indicating which of the ports 62 is coupled to which of the applications 52-54 and also possibly indicating the state of each of the ports 62. Each of the applications 52-54 may also internally maintain a similar connection table. In some embodiments, it is possible for each of the applications 52-54 and/or the SCSI driver 56 to use different internal identifiers to refer to the same one of the ports 62.

The process manager 58 interacts with the SCSI driver 56 to facilitate migration of port metadata (state information) along with migration of corresponding data. That is, for example, if the host 32 initially performs I/O operations using the storage device 36, but then switches to using the storage device 37, the process manager 58 facilitates the switch by handling the appropriate transfer of the metadata corresponding to the data. Operation of the process manager 58 is described in more detail elsewhere herein.

Figure 3:
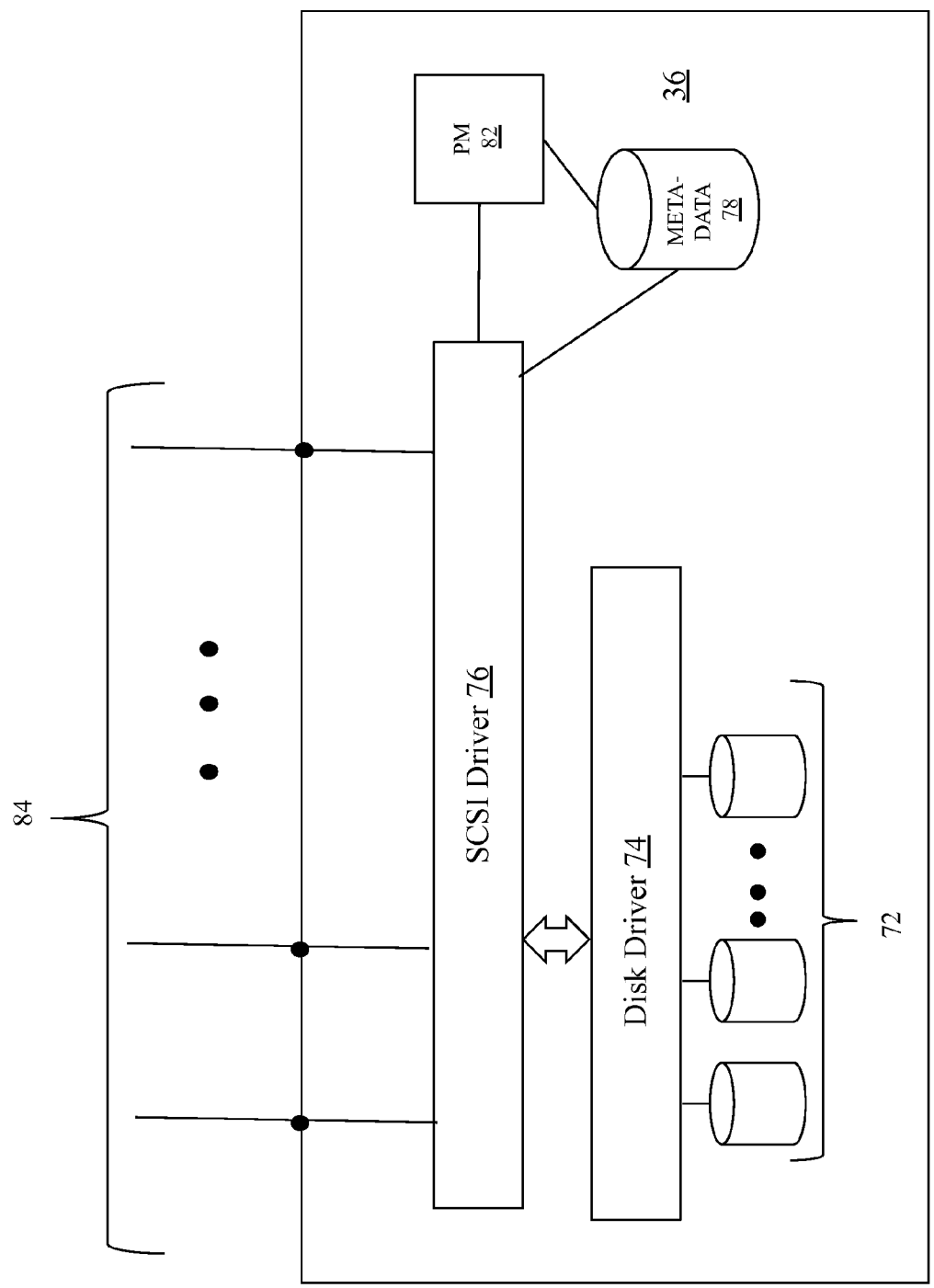
FIG. 3 is a schematic diagram illustrating in more detail a host according to an embodiment of the system described herein.

Referring to FIG. 3, the storage device 36 is shown in more detail as including one or more storage units 72, a disk driver 74 coupled to the storage units 72, and a SCSI driver 76 coupled to the disk driver 74. Although the specific storage device 36 is shown in FIG. 3, the discussion herein is meant to include any appropriate storage device. The storage device 36 may be a disk array storage device so that the storage units 72 are disk drives. Of course, the storage device 36 could be any other type of storage device and may include at least come flash drives or similar. The SCSI driver 76 is similar to the SCSI driver 56, discussed above in connection with FIG. 2, except that the SCSI driver 76 provides I/O for the storage device 36 rather than the host 32. In an embodiment herein, the SCSI driver 76 acts as a target to receive I/Os while the SCSI driver 56 acts as an initiator to send I/Os.

The storage device 36 also includes SCSI metadata 78 (state information), coupled to the SCSI driver 76, that maintains, inter alia, the state of connections to the storage device 36. A process manager 82 is coupled to both the SCSI driver 76 and the SCSI metadata 78. The storage device 36 also includes a plurality of ports 84 that provide logical I/O channels for the storage device 36. As with the host 32, each of the ports 84 may correspond to a separate physical connection or at least some of the ports 84 may correspond to the same physical connection. The SCSI driver 76 may maintain a connection table indicating which of the ports 84 is coupled to which of the storage units 72 and also possibly indicating the state of each of the ports 84. The disk driver 74 may also internally maintain a similar connection table. In some embodiments, it is possible for the different tables to use different internal identifiers to refer to the same one of the ports 84.

The process manager 82 interacts with the SCSI driver 76 to facilitate migration of port metadata (state information) along with migration of corresponding data. That is, for example, if the host 32 initially performs I/O operations using the storage device 36, but then switches to using the storage device 37, the process manager 84 facilitates the switch by handling the appropriate transfer of metadata. Operation of the process manager 84 is described in more detail elsewhere herein.

Connections between the hosts 32-34 and the storage devices 36-38 may be provided by defining a plurality of paths therebetween through the network 42. Each of the paths may include a source port (initiator port), a destination port (target port), and a port state identifier (state descriptor). The source port may correspond to a port on one of the hosts 32-34 while the destination port may correspond to a port on one of the storage devices 36-38. The defined paths may correspond to the connection tables maintained by the hosts 32-34 and the storage devices 36-38.

In an embodiment herein, the process manager 82 of the storage device 36 is used to facilitate migration from one of the storage devices 36-38 to another one of the storage devices 36-38. Of course, it is also possible to have other arrangements so that, for example, the process manager 58 of the host 32 may be used to facilitate migration from one of the storage devices 36-38 to another one of the storage devices 36-38.

Figure 4:
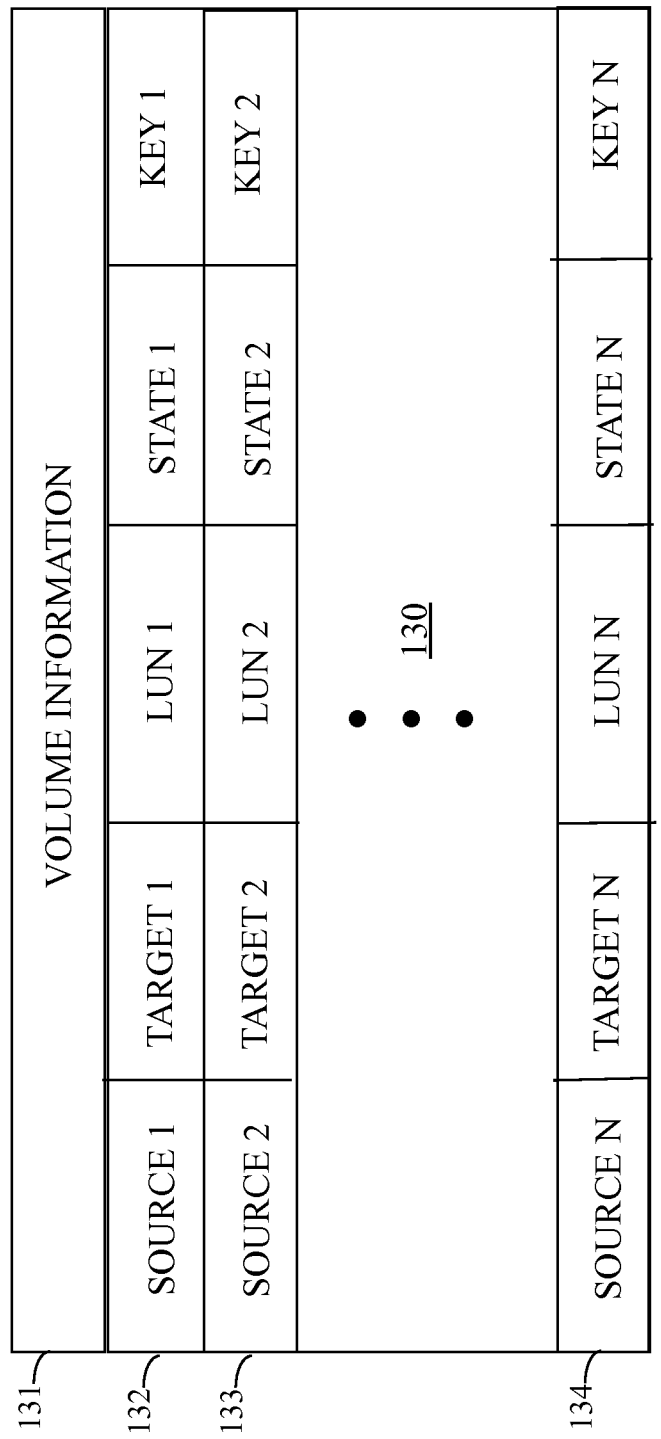
FIG. 4 is a diagram illustrating a volume entry for a metadata table according to an embodiment of the system described herein.

Referring to FIG. 4, a volume entry 130 for a metadata table includes volume information 131 and a plurality of path entries 132-134 where each describes a specific path to or from the volume. In an embodiment herein, a metadata table for an application includes an entry for each of the volumes used by the application where each of the entries is like the volume entry 130 shown in FIG. 4. The volume information 131 includes volume specific metadata, such as the volume geometry, the world-wide name of the volume, etc. Of course, the particular volume metadata used for the volume information 131 is somewhat implementation dependent.

Each of the path entries 132-134 includes an initiator (source) port, a target port, a logical unit number (LUN), a state descriptor and a key. The initiator port may be the port that sends I/Os through the path while the target port receives I/Os through the path. The port identifiers may be global identifiers that distinguish particular ports from other ports. The LUNs, on the other hand, may be local to whatever entity is maintaining a copy of the table 130. The state descriptor may indicate information about the path in the context of the volume metadata. In an embodiment herein, the path state information may include reservation information, for example corresponding to SCSI-2 or SCSI-3 reservations. The key is a unique identifier that is provided at the time of registration to uniquely identify the path. In some embodiments, a different type of identifier (e.g., a unique identifier) may be used in place of the key to identify the path.

In an embodiment herein, the metadata table 130 may be transferred by first creating a data structure to contain the information in the table 130, populating the structure with data from the table 130, and then using the structure to create a new version of the table 130 at the new storage device. Note that the system described herein may be used in instances where data is being migrated to dissimilar types of storage devices, and the metadata table 130 may have a different structure at the new storage device than at the old storage device. As used herein, "old" and "new" may be used to refer to source and target storage devices, respectively, and may not necessarily indicate a relative age of the storage devices. The data structure used to store the metadata table may be platform independent. In some embodiments, other types of transformations may be provided. For example, the transformation may include adding a Unit Attention message to all the new paths, to notify the host that all the I/Os that were queued in the old paths are lost and have to be retried.

Figure 5:
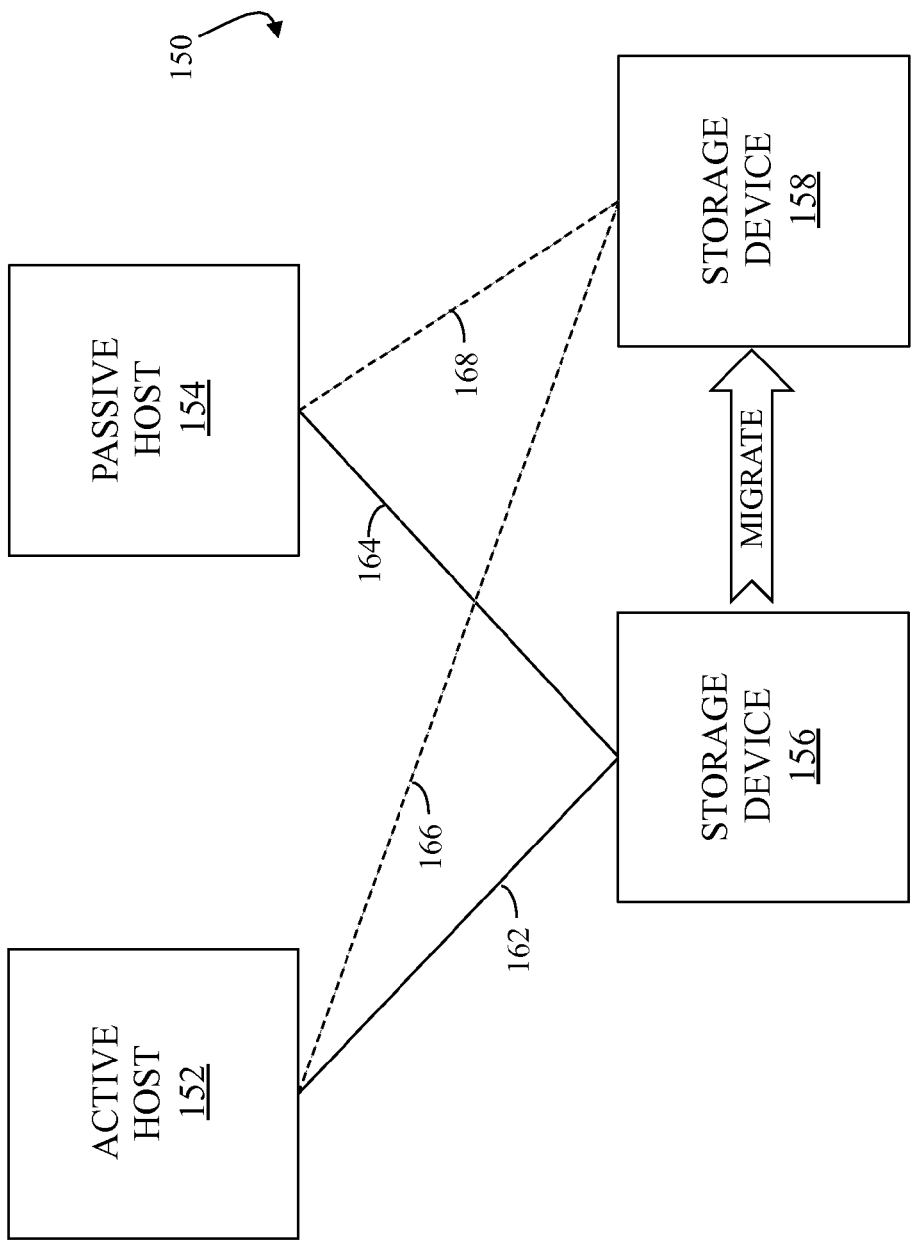
FIG. 5 is a schematic a diagram that shows an active host and a passive host coupled to an source storage device and a target storage device according to an embodiment of the system described herein.

Referring to FIG. 5, a diagram 150 illustrates an active host 152 and a passive host 154 accessing a storage device 156. In the example of FIG. 5, the active host 152 and the passive host 154 access the same data on the storage device 156. The active host 152 performs work in the form of one or more applications that read and write data to the storage device 156. The passive host 154 is maintained as a fallback in case the active host 152 fails. As described in more detail elsewhere herein, the system uses storage state information to determine when to make the passive host 154 active.

The diagram 150 also illustrates migrating data from the storage device 156 to another storage device 158. Migrating the data includes migrating corresponding state information so that, after the migration, the active host 152 and the passive host 154 preserve the relationship that existed prior to the migration. A first path 162 is provided from the active host 152 to the storage device 156 while a second path 164 is provided from the passive host 154 to the storage device 156. As a result of the migration, the path 162 is replaced by a new path 166 from the active host 152 to the new storage device 158 while the path 164 is replaced by a new path 168 from the passive host 154 to the new storage device 158. As discussed elsewhere herein, it is useful that the state of the paths be preserved.

Migration of data from old storage device 156 to the new storage device 158 is independent of whether a failover occurs from the active host 152 to the passive host 154. However, as described in more detail elsewhere herein, proper operation of the failover mechanism includes maintaining state information related to the paths between the storage devices 156, 158 and the hosts 152, 154. Thus, data migration from the old storage device 156 to the new storage device 158 should preserve the state information throughout the migration process without disrupting operation of the hosts 152, 154.

Referring to FIG. 6, a flow chart 200 illustrates steps performed by the active host 152 in connection with maintaining its status. In an embodiment herein, the storage devices 156, 158 maintain a table like that shown in FIG. 4 and discussed above. The paths for the active host 152 are in a state allowing I/O operations between the active host 152 and the storage device 156 while the paths for the passive host 154 are not. Different path states are described in more detail elsewhere herein. In some embodiments, a host can request that a reservation between the storage device and another host be broken. If the other host does not re-reserve the path, the host that breaks the reservation becomes the active host. This is illustrated in more detail below.

Processing for the flow chart 200 begins at a first step 202 where the active host waits for a predetermined amount of time. The amount can be any amount, such as three seconds. Following the step 202 is a step 204 where the active host 152 sends a reservation command to the storage device. Following the step 204 is a test step 206 where it is determined if the active host 152 has any pending I/O operations. If not, then control transfers back to the step 202 for another iteration. Otherwise, control transfers from the step 206 to a step 208 where the active host 152 sends the I/O to the storage device. Following the step 208, control transfers back to the step 202 for another iteration.

Referring to FIG. 7, a flow chart 220 illustrates steps performed by the passive host 154 in connection with maintaining its status and possibly becoming active if conditions warrant. Processing begins at a first step 222 where the passive host 154 sends a reservation command to the storage device. Following the step 222 is a step 224 where the passive host 154 waits a predetermined amount of time. The amount of time may be any amount that is longer than the amount of time the active host 152 waits at the step 202, discussed above. In an embodiment herein, the amount is ten seconds.

Following the step 224 is a step 226 where the passive host 154 attempts an I/O operation. Note that if the active host 152 is operational, then the active host 152 would have sent a reservation command while the passive host was waiting at the step 224. On the other hand, if the active host 152 is not operational, then the reservation provided by the passive host at the step 222 would have been the most recent reservation command received by the storage device. Following the step 226 is a test step 228 where it is determined if the I/O attempted at the step 226 is successful. If not (the active host 152 is operational), then control transfers back to the step 222 for another iteration. Otherwise, control transfers from the step 228 to a step 232 where the passive host 154 changes its status to active. Following the step 232, processing is complete.

As can be seen from the example of FIGS. 5-7, discussed above, it is important to maintain state information when migrating data from one storage device to another. Otherwise, if state information is not maintained, then the passive host 154 may incorrectly change its status to active or may incorrectly maintain its status as passive when it should be active. The state of the new path to the new storage device should be the same as the state of the old path when the migration occurred.

Figure 8:
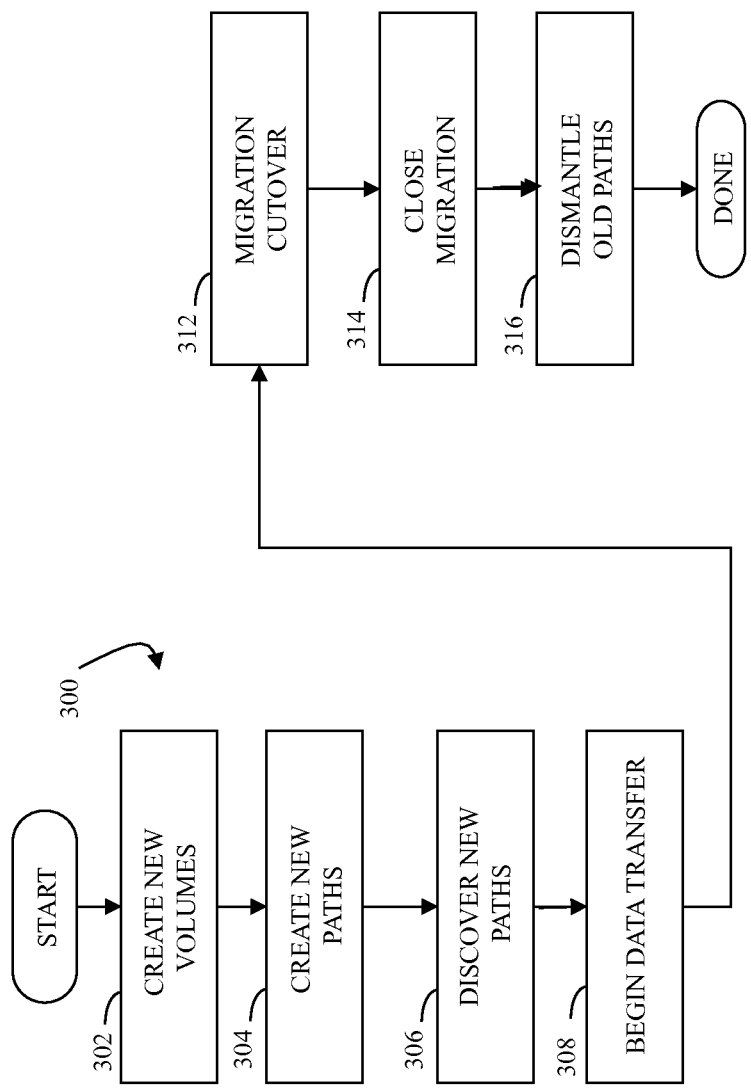
FIG. 8 is a flow chart illustrating steps performed by a process manager for migration according to an embodiment of the system described herein.

Referring to FIG. 8, a flow chart 300 illustrates steps performed in connection with migrating from using a first one of the storage devices 36-38 (old storage device) to a second one of the storage devices 36-38 (new storage device). As used herein, "old" and "new" may be used to refer to source and target storage devices, respectively, and may not necessarily indicate a relative age of the storage devices. Thus, the terms "old storage" and "source" may be used interchangeably unless otherwise indicated. Similarly, the terms "new storage" and "target" may also be used interchangeably unless otherwise indicated.

It is desirable to be able to provide the migration in a way that is transparent to an entity accessing the data and does not require suspension of the entities accessing the data. That is, one or more of the applications 52-54 on one or more of the hosts 32-34 operate continuously before and after migration of data from one of the storage devices 36-38 to another one of the storage devices 36-38. As described elsewhere herein, providing a seamless migration includes properly migrating metadata (state information) associated with the data so that each new path takes on state information of a corresponding old path. Note that the processing illustrated by the flow chart 300 may be performed by the process manager 82 of the storage device 36 and/or by other appropriate processes/devices, such as the process manager 58 possibly in concert with other processing devices.

Processing for the flow chart 300 begins at a step 302 where new volume(s) (e.g., logical volume(s)) are created on the new storage device. The new volume(s) will be provided with the data that is being transferred to the new storage device. In an embodiment herein, the new volume(s) will be initially provided in a mode so that the volume(s) can be recognized by host(s) coupled thereto, but no data can be accessed at the volume(s). This may be referred to as the "passive mode". Following the step 302 is a step 304 where new paths are created from the one or more of the hosts (computing devices) to the new storage device. Following the step 304 is a step 306 where the new paths are discovered by the hosts (e.g., the source entities determine the target ports and characteristics of devices corresponding thereto). In an embodiment herein, the paths to the new storage device are initiated in a way that initially prevents any new I/O operations being performed using those paths (e.g., the volume(s) are passive). Subsequently, the paths are modified to allow I/O operations, as described in more detail elsewhere herein.

Following the step 306 is a step 308 where metadata and user data is transferred from the volume(s) on the old storage device to the volume(s) on the new storage device using any appropriate technique. Mechanisms for transferring data are known. In some embodiments, all of the metadata is first copied and then user data migration is initiated at the step 308 and is performed asynchronously and in parallel with respect to the remaining processing performed in connection with the flow chart 300. It is possible to use the Symmetrix ORS (Open Replication Session) provided by EMC Corporation of Hopkinton, Mass. at the step 308.

Following the step 308 is a step 312 where the system performs a migration cutover. Performing the migration cutover at the step 312 is described in more detail elsewhere herein. Note that, in some embodiments, the migration cutover is not performed at the step 312 until after all of the data has been transferred from the old storage device to the new storage device, which is initiated at the step 308, described above. In other embodiments, the step 312 may be performed prior to transferring all of the data from the old storage device to the new storage device, in which case an appropriate mechanism may be provided to handle access to data that has not yet been transferred.

Following the step 312 is a step 314 where the migration operation is closed. Closing the migration operation at the step 314 is described in more detail elsewhere herein. Following the step 314 is a step 316 where the paths to the old storage device are dismantled. Dismantling the old paths at the step 316 is performed by an appropriate mechanism depending upon how the paths are implemented. In some embodiments, the step 316 may not be performed. Following the step 316, processing is complete.

Referring to FIG. 9, a flow chart 330 illustrates in more detail the migration cutover step 312 discussed above in connection with the flow chart 300 of FIG. 8. Processing for the flow chart 330 begins at a step 332 where the state of the target storage device is changed from passive (set at initialization, as described above) to stalled-active. In the stalled-active state, the target storage device accepts I/O's from hosts, but does not service the I/O's. Instead, while in the stalled-active state, the target storage device queues I/O requests for a relatively short period of time (e.g., seven to eight seconds) and then the target storage device fails the I/O requests and sends a check condition status to the requesting host. Upon receipt of the check condition status, the requesting host may retry the I/O.

Following the step 332 is a step 334 where the state of the source storage device is changed from active to passive. As discussed elsewhere herein, when a storage device is in the passive state, the storage device rejects I/O requests. Thus, following the step 334, a host may first attempt an I/O at the (now passive) source storage device. Following the I/O request being rejected at the source storage device, the host may then redirect the I/O to the target storage device which accepts the I/O since the target storage device is in the stalled-active state.

Following the step 334 is a step 336 where the reservation key is read from the source storage device. As discussed elsewhere herein, the table 130 maintained by each device may include a reservation key (or similar) that may be used to maintain the hosts in an appropriate active/passive state. Note that any other appropriate volume metadata may be read at the step 336. Following the step 336 is a step 338 where the reservation key(s) obtained from the source at the step 336 are copied to the table at the target. In some embodiments, the hosts maintain the reservations according to the value of the key associated with a path so that two paths having the same reservation key (e.g., path between host to source and path between host and target) appear to the host to be the same reservation.

Following the step 338 is a step 342 where the host(s) are notified of the new active I/O path(s) to the target storage device. Of course, for any host(s) that have already attempted an I/O to the source storage device and then subsequently tried, and found, the active path to the target storage device, the notification at the step 342 is probably not necessary. Following the step 342 is a step 344 where the state of the target storage device is changed from stalled-active to active. Note that after the step 344, the system operates in steady state with I/O's being serviced by the target storage system. Following the step 344, processing is complete.

Note that it is also possible to use the system described herein for an unplanned failover from the source storage device to the target storage device. However, in such a case, it would not be possible for the target storage device to obtain any reservation information (e.g., keys) from the (failed) source storage device. Accordingly, it is useful for the target storage device to possess the reservation information prior to the failover. In an embodiment herein, whenever a host requests a reservation from the source storage device, the source storage device does not return a result until after the reservation information has been transferred from the source storage device to the target storage device. Thus, the target storage device maintains up-to-date reservation information in case of a failover. Of course, prior to the failover, it is important to have already created the target, copied the user data from the source to the target, etc. Note also that, in case of a failover to the target storage device, most of the processing illustrated by the flow chart 370 of FIG. 9 may be eliminated, although it still may be useful to provide the processing illustrated by the steps 342, 344.

In some cases, it may be desirable to prevent data migration and a switchover to the target storage area if certain appropriate conditions are not met. For example, if the target storage area has less storage space than the source storage area and does not have enough storage space for all of the data, then it may be desirable to prevent the migration/switchover. Accordingly, it may be desirable to perform additional processing at the step 332, discussed above, in which the target is switched to the stalled-active state. The additional processing tests certain conditions prior to switching the state of the target.

Referring to FIG. 10, a flow chart 370 illustrates steps performed in connection with determining if conditions are proper prior to switching to a target storage device. Processing begins at a first step 372 where it is determined if metadata replication has completed. As mentioned elsewhere herein, it may not be appropriate to switch to a target storage device unless and until all metadata has been copied from the source storage device to the target storage device (e.g., using ORS or any other appropriate mechanism). Note that it may not be necessary to replicate all user data prior to switching. In some cases, user data replication is completed after switching to the target storage device. Also, in some embodiments, initiating replication fails at the step 308 if the source storage device and the target storage device are not the same size, although, in some cases, it may be possible to proceed if the target storage device is larger than the source storage device. In some cases, a larger target storage device is configured to "spoof" the source device by returning a size that is equal to the source storage device.

If it is determined at the step 372 that replication is complete, then control passes from the test step 372 to a test step 374 where it is determined if the target storage device can access the same keys as the source storage device. Note that the keys correspond to the hosts that access the storage devices. It is possible to use any appropriate mechanism to confirm that the hosts that access the source storage device can also access the target storage device. In some cases, it may be possible that the target storage device does not have access to all of the keys that are accessible by the source storage device. For example, a cable connecting a host to the target storage device may be faulty so that the target storage device does not receive the key from the host. If it is determined at the step 374 that the target storage device does not have access to all of the keys that are accessible by the source storage device, then control transfers from the test step 374 to a step 376 where error processing is performed. The error processing performed at the step 376 may include providing a message to an operator and aborting the migration operation. Following the step 376, processing is complete.

If it is determined at the step 374 that the target storage device is connected to all the hosts that are connected to the source storage device, then control transfers from the test step 374 to a test step 378 where it is determined if the registration information at the target storage device matches the registration information at the source storage device. Although it is expected that the registration information would match following transferring metadata between the devices, discussed above, it is possible that there is a mismatch due to other circumstances, such as a software error, an unexpected system disruption, etc. If it is determined at the test step 378 that the registration information matches, then processing proceeds to a step 379, where reservation information is moved from the source storage device to the target storage device. Following the step 379, processing is complete, in which case processing may continue through the steps 342, 344, discussed above.

If it is determined at the test step 378 that the registration information does not match, then control transfers from the test step 378 to a step 382 where the system attempts to cause the registration information to match. In an embodiment herein, processing provided at the step 382 is similar to the processing provided at the steps 336, 338, described above, where the target storage device requests key information from the source storage device and then the target storage device replaces key information in a table in the target storage device with key information received from the source storage device. Following the step 382 is a test step 384 where it is determined the processing provided at the step 382 was successful. The test at the step 384 is similar, if not identical, to the test provided at the step 378. If it is determined at the test step 384 that the registration information matches, then control transfers to the step 379, discussed above, where reservations are moved from the source storage device to the target storage device. Following the step 379, processing is complete, in which case processing may continue through the steps 342, 344, discussed above. Otherwise, control transfers from the test step 384 to the step 376, discussed above, where error processing is performed. Following the step 376, processing is complete.

The system described herein may be used for migrating executable images between hosts as well as migrating data on storage devices. Note that, in some instances, the order of steps in the flowcharts may be modified, where appropriate. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. The system described herein includes computer software, in a non-transitory computer readable medium, that executes any of the steps described herein.

While the invention has been disclosed in connection with various embodiments, modifications thereon will be readily apparent to those skilled in the art. Accordingly, the spirit and scope of the invention is set forth in the following claims.

What is claimed is:

1. A method of migrating data from a source storage device to a target storage device, comprising:
    creating new paths to the target storage device;
    setting the target storage device to a stalled-active state, wherein, in the stalled-active state, I/O operations are initially accepted and queued for a period of time, and wherein, after the period of time, the I/O operations are rejected and a check condition status sent;
    setting the source storage device to a passive state where at least some I/O operations are rejected;
    transferring metadata corresponding to the source storage device to the target storage device, wherein state information is transferred from the source storage device to the target storage device; and
    setting the target storage device to an active state where I/O operations are accepted and performed.

2. The method according to claim 1, further comprising:
    creating new volumes on the target storage device; and
    transferring data from the source storage device to the target storage device.

3. The method according to claim 2, wherein setting the target storage device to the active state where I/O operations are accepted and performed occurs after all of the metadata and data is transferred from the source storage device to the target storage device.

4. The method according to claim 1, further comprising:
    dismantling old paths to the source storage device.

5. The method according to claim 1, wherein transferring metadata includes exporting the metadata from the source storage device to a platform-independent format and then subsequently importing the metadata to the target storage device and wherein a format of the metadata on the target storage device is different from a format of the metadata on the source storage device.

6. The method according to claim 1, wherein each of the paths includes a source port, a target port, a LUN, a state descriptor, and a reservation key.

7. The method according to claim 1, wherein the paths correspond to SCSI connections.

8. The method according to claim 7, wherein a process manager interacts with a SCSI driver to transfer the metadata.

9. The method according to claim 1, wherein, in the stalled-active state of the target storage device, I/O operations are rejected with the check condition status after the period of time of between seven and eight seconds has elapsed.

10. A non-transitory computer readable medium storing software that migrates data from a source storage device to a target storage device, the software comprising:
    executable code that creates new paths to the target storage device;
    executable code that sets the target storage device to a stalled-active state, wherein, in the stalled-active state, I/O operations are initially accepted and queued for a period of time, and wherein, after the period of time, the I/O operations are rejected;
    executable code that sets the source storage device to a passive state where at least some I/O operations are rejected;
    executable code that transfers metadata corresponding to the source storage device to the target storage device, wherein state information is transferred from the source storage device to the target storage device; and executable code that sets the target storage device to an active state where I/O operations are accepted and performed.

11. The non-transitory computer-readable medium according to claim 10, further comprising:

executable code that creates new volumes on the target storage device; and executable code that transfers data from the source storage device to the target storage device.

12. The non-transitory computer-readable medium according to claim 11, wherein the target storage device is set to the active state where I/O operations are accepted and performed after all of the metadata and data is transferred from the source storage device to the target storage device.

13. The non-transitory computer-readable medium according to claim 10, further comprising:

executable code that dismantles old paths to the source storage device.

14. The non-transitory computer-readable medium according to claim 10, wherein executable code that transfers metadata includes executable code that exports the metadata from the source storage device to a platform-independent format and executable code that imports the metadata to the target storage device and wherein a format of the metadata on the target storage device is different from a format of the metadata on the source storage device.

15. The non-transitory computer-readable medium according to claim 10, wherein each of the paths includes a source port, a target port, a LUN, a state descriptor, and a registration key.

16. The non-transitory computer-readable medium according to claim 10, wherein the paths correspond to SCSI connections.

17. The non-transitory computer-readable medium according to claim 16, wherein a process manager interacts with a SCSI driver to transfer the metadata.

18. The non-transitory computer-readable medium according to claim 10, wherein, in the stalled-active state of the target storage device, I/O operations are rejected with the check condition status message after the period of time of between seven and eight seconds has elapsed.

* * * * *